US012710101B2

(12) United States Patent
Grassi

(10) Patent No.: US 12,710,101 B2
(45) Date of Patent: Aug. 18, 2026

(54) FLEXIBLE SLEEVE, AND DEVICES AND METHODS INCORPORATING THE SAME

(71) Applicant: Alotech Limited R & D, LLC, Brooklyn, OH (US)

(72) Inventor: John Grassi, Brooklyn, OH (US)

(73) Assignee: ALOTECH LIMITED R & D, LLC, Brooklyn, OH (US)

( * ) Notice: Subject to any disclaimer, the term of this patent is extended or adjusted under 35 U.S.C. 154(b) by 0 days.

(21) Appl. No.: 18/745,690

(22) Filed: Jun. 17, 2024

(65) Prior Publication Data

US 2025/0383023 A1 Dec. 18, 2025

(51) Int. Cl.
*F16K 7/04* (2006.01)

(52) U.S. Cl.
CPC .................................... *F16K 7/04* (2013.01)

(58) Field of Classification Search
CPC ..... F16K 7/02; F16K 7/04; F16K 7/06; F16K 7/07
USPC ............................................. 251/4, 5, 7, 8
See application file for complete search history.

(56) References Cited

U.S. PATENT DOCUMENTS 5,007,446 A * 4/1991 Grove .................. F16K 11/027 251/5
6,106,506 A * 8/2000 Abell ....................... F16K 7/07 604/257
7,168,444 B2 1/2007 Sesser et al.
7,732,735 B2 6/2010 Bourget et al.
7,886,837 B1 * 2/2011 Helfgott ................ A62C 35/68 169/5
10,968,729 B2 4/2021 Sylvester
2004/0084172 A1 5/2004 Vincent et al.
2008/0087853 A1 4/2008 Kees
2008/0223589 A1 * 9/2008 Young .................. A62C 35/68 239/128
2010/0206415 A1 8/2010 Ellis et al.
(Continued)

OTHER PUBLICATIONS

Oct. 16, 2025 International Search Report and Written Opinion issued in corresponding International Application No. PCT/US2025/034011. (14 pp.).

*Primary Examiner* — Kenneth Rinehart
*Assistant Examiner* — Jonathan J Waddy
(74) *Attorney, Agent, or Firm* — NIXON PEABODY LLP

(57) ABSTRACT

A device that may be a valve or a pinch valve is disclosed. The device includes at least the following components: (1) a flexible sleeve and (2) two end connection ports that are located on opposite ends of the flexible sleeve. The device may also include one or more of the following: an actuator, a body or housing, and a heating element. The flexible sleeve is capable of having the high-temperature material flowed therein and being in direct contact with the flexible sleeve. The high-temperature material is a material at a temperature above 200° C. For example, the high-temperature material may be a molten material in a casting process. A method of using the device is also disclosed. The method involves, at least, the following steps: (1) providing a flexible sleeve, and (2) flowing a high-temperature material into the flexible sleeve. The steps may be part of a casting process involving molten material, such as molten metal or molten metal alloy. The flexible sleeve may be provided as part of a device, such as a valve or pinch valve.

16 Claims, 13 Drawing Sheets

(56) References Cited

U.S. PATENT DOCUMENTS

| | | | |
|---|---|---|---|
| 2012/0018654 | A1 | 1/2012 | Wennberg et al. |
| 2023/0265018 | A1 | 8/2023 | Chitalkar et al. |

* cited by examiner

"PRIOR ART"

"PRIOR ART"

"PRIOR ART"

INVENTIVE
FLEXIBLE
SLEEVE

TYPICAL
FLEXIBLE
RUBBER
SLEEVE

INVENTIVE
FLEXIBLE
SLEEVE

FLEXIBLE SLEEVE, AND DEVICES AND METHODS INCORPORATING THE SAME

FIELD

The invention relates to a flexible-sleeve. The flexible-sleeve is useful in methods involving movement of high-temperature materials, e.g., casting methods. The flexible sleeve may be incorporated into devices that are useful in methods involving movement of high-temperature materials, e.g., casting methods. When used in such devices and/or methods, the flexible-sleeve may be a limited-use flexible sleeve. For example, it has the flexibility that it may need to be discarded or revived after a limited number of uses, otherwise it may be used with duration.

BACKGROUND

Valves are devices that regulate, direct, or control the flow of fluids, e.g., gases, liquids, fluidized solids, or slurries, by opening, closing, or partially obstructing various passage ways. There are many types of valves, e.g., ball valves, butterfly valves, check valves, gate valves, knife gate valves, globe valves, needle valves, and pinch valves.

Pinch valves are a commonly used valve type. The main components of a pinch valve are the following: a body, end connections, and a rubber sleeve. The rubber sleeve must be capable of being and/or configured to be pinched or pinch closed so that the pinch valve can shut off flow of a fluid material. A schematic drawings of an exemplary pinch valve are found in FIG. 1A (rubber sleeve not pinched or open), FIG. 1B (rubber sleeve closed or pinched), and FIG. 1C (rubber sleeve throttled or partially pinched).

Pinch valves must also include a component for throttling, pinching, and/or releasing the rubber sleeves. This component may be an actuator. Two main types of actuator exist-manual and automatic.

Pinch valves have been designed to be used with a wide-variety of materials. Commonly, this is done by changing the material use to form the pinch valve sleeve, which is an essential component of a pinch valve. Common sleeve materials include, Neoprene®, Natural Rubber, Ethylene Propylene Diene monomer (EPDM) rubber, Viton®, Silicon, Nitrile, Hypalon®, and Butyle. Neoprene is known to be suitable for use with animal oils, natural gas, printing ink, and soap. Natural rubber may be used with water, wine and alcohols, foundry sand, silica sand, metals, waste water, mineral slurries, cement, concrete, and the like. EPDM is suitable for use with hot water, steam, dilute acid, and alkalis. Silicone may be used with steam or sulfuric acid. Nitrile is used with products having oil or fat content, including sewage, milk, butter, chocolate, fish, vegetable oils, olive oils, mineral oils, and the like. Hypalon® may be used with chlorides, peroxides, and acids. Butyle may be used with alcohol, amino acid, barium, ammonium, and acetic acids. As of the filing of this application, there is no commercially available pinch valve capable of, intended for, or configured for use with molten materials, e.g., molten metals or molten metal alloys used in a casting process. The aforementioned rubber materials, which are typically used to form a pinch valve sleeves, would be degraded, deformed, oxidized, and/or melted by molten materials, e.g., molten metals or molten metal alloys used in a casting process. The maximum operating temperature for silicone sleeves, which may be used with steam, and Viton® sleeves is only 130° C.

Thus, there is a need to provide a pinch valve sleeve having an operating temperature greater than 130° C. A pinch valve sleeve capable of and/or configured for use with molten materials, e.g., molten metals or molten metal alloys, is also desirable.

An issue that is faced in methods involving molten materials, e.g., molten metals or molten metal alloys, is that cooling (and solidification) of molten material may damage or destroy parts of the valve. Premature cooling and solidification of molten materials is particularly undesirable in casting methods.

Thus, it is also desirable to design a device that minimizes or prevents this issue.

SUMMARY

The device described herein may be used in processes involving high temperature materials, e.g., casting processes. The flexible sleeve of the device is made of a material that is capable of coming and/or configured to come into contact with a high temperature material and not being degraded, deformed, oxidized, and/or melted like the aforementioned rubber materials would be. The device described herein may also minimize or prevent cooling and solidifying of the high-temperature material during use of the device, e.g., when a high-temperature material is being restrained by the device and not flowing.

In one aspect, the device comprises, consists of, or consists essentially of the following components: (1) a flexible sleeve, and (2) two end connection ports located on opposite ends of the sleeve. The two end connection ports may be substantially aligned along a longitudinal axis of the flexible sleeve. The device described is capable of having and/or configured to have a high-temperature material enter, flow through, and exit the flexible sleeve. The high temperature material may enter or exit the flexible directly or indirectly via the ports. The high-temperature material may flow through, and come in direct contact with, the flexible sleeve without causing the sleeve to be degraded, deformed, oxidized, and/or melted like a typical rubber flexible sleeve would.

In some preferred embodiments, the high-temperature material is a material at a temperature of 200° C. or more. In some embodiments, the high-temperature material is a molten metal, e.g., molten aluminum, or a molten metal alloy, e.g., an aluminum alloy.

In some preferred embodiments, the flexible sleeve may be made from a material comprising at least one of the following: silica-fiber, glass-fiber, carbon-fiber, aramid-fiber, PEEK (polyether ether ketone)-fiber, PFA (perfluoroalkoxy)-fiber, and any combination thereof.

In some embodiments, the flexible sleeve may be made from a non-wetting ceramic material.

In some embodiments, the flexible sleeve is a composite comprising, consisting of, or consisting essentially of the flexible sleeve provided inside of a typical rubber flexible sleeve so that the sleeves are coaxial. This is a "sleeve within a sleeve" arrangement. In other embodiments, the composite may comprise, consist of, or consist essentially of the flexible sleeve being provided with a non-porous coating on an exterior surface thereof. The non-porous coating may be a rubber coating.

In some embodiments, at least one of the two end connection ports a threaded connection port, a welded connection port, a soldered or sweat connection port, a welded connection port, a flanged connection port, a compression connection port, a clamp-style end connection port, a union/true union connection port, or a glued connection port.

In some embodiments, the device comprises an actuator capable of applying and/or configured to apply pressure to the flexible sleeve to slow or stop the flow of the high-temperature material though the flexible sleeve. The actuator may be a manual actuator or an automatic actuator.

In some embodiments, the flexible sleeve of the device is partially or completely surrounded by an insulative material, an exothermic material, or a combination of an insulative material and an exothermic material. These materials act to minimize or prevent the high-temperature material, e.g., molten metal, from cooling and solidifying in the device.

In some embodiments, the device may comprise one or more heating elements. These heating elements act to minimize or prevent the high-temperature material, e.g., molten metal or molten metal alloy, from cooling and solidifying in the device.

In some embodiments, the device is a pinch valve. For example, the device may be a manual or automatic pinch valve.

In another aspect, a method is described. The method comprises the following step: (1) providing a flexible sleeve; and (2) flowing a high-temperature material into the sleeve. The high-temperature material is a material at or heated to a temperature of 200° C. or more. The flexible sleeve is capable of having and/or configured to have the high-temperature material flow into the sleeve and be in direct contact with the sleeve. This is unlike prior rubber sleeves, which cannot have such materials come in direct contact with them without being degraded, deformed, oxidized, and/or melted.

In another aspect, another method is described. The method comprises the following steps: (1) providing a flexible sleeve; and (2) flowing a pre-determined amount of a high-temperature material through the flexible sleeve to complete a run. The flexible sleeve is capable of having and/or configured to have the high-temperature material flowed through it and in direct contact with it. The high-temperature material, in some embodiments, is a material having a temperature of 200° C. or more.

In some embodiments, the flexible sleeve is used for five or less runs, three or less runs, or only one run before it needs to be regenerated or discarded. In some embodiments herein, the flexible sleeve is used for five or less, three or less, or just one run, and then the flexible sleeve is either regenerated or discarded. In such embodiments, the flexible sleeve is a limited-use flexible sleeve.

In some embodiments, the flexible sleeve may be used with duration. For example, in some cases, the flexible sleeve may be used as many times as a typical rubber flexible sleeve, e.g., hundreds of thousands of times. In other embodiments, the flexible sleeve may be used tens of thousands of times, thousands of times, hundreds of times, or between ten and ninety-nine times.

In some embodiments, the step of providing the flexible sleeve may comprise providing two or more flexible sleeves. The two or more flexible sleeves may be provided in series or in parallel.

In some embodiments, the flexible sleeve may be provided as part of a composite comprising the flexible sleeve provided inside of a typical rubber flexible sleeve so that the sleeves are coaxial. In other embodiments, the flexible sleeve may be provided as part of a composite comprising the flexible sleeve and a non-porous coating provided on an exterior surface of the flexible sleeve. For example, the non-porous coating may be a rubber coating.

In some embodiments, the flexible sleeve may be provided as a component of a device.

The device may comprise the following components: (1) the flexible sleeve, and two end connection ports that are located on opposite ends of the flexible sleeve and are substantially aligned along a longitudinal axis of the flexible sleeve. The device may be a pinch valve.

In some embodiments, the method may be a casting method, e.g., a metal or metal alloy casting method.

DETAILED DESCRIPTION

Figure 1A:
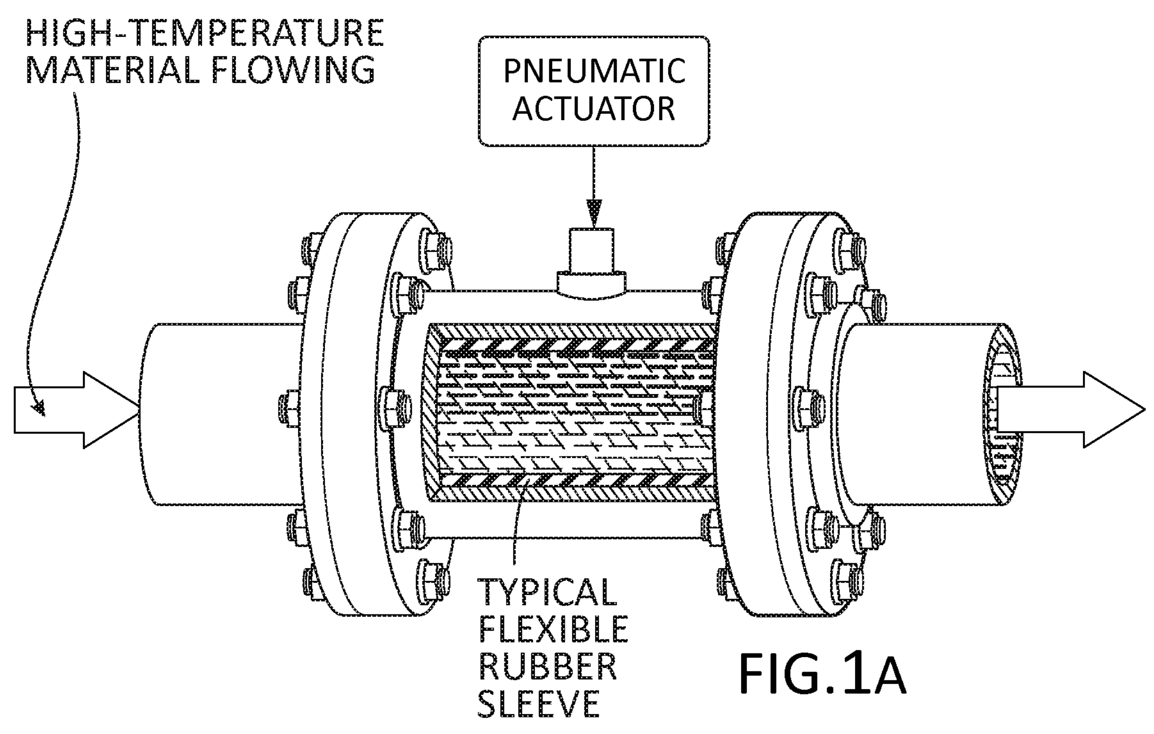
FIG. 1A is a schematic drawing of a pinch valve.
Figure 1B:
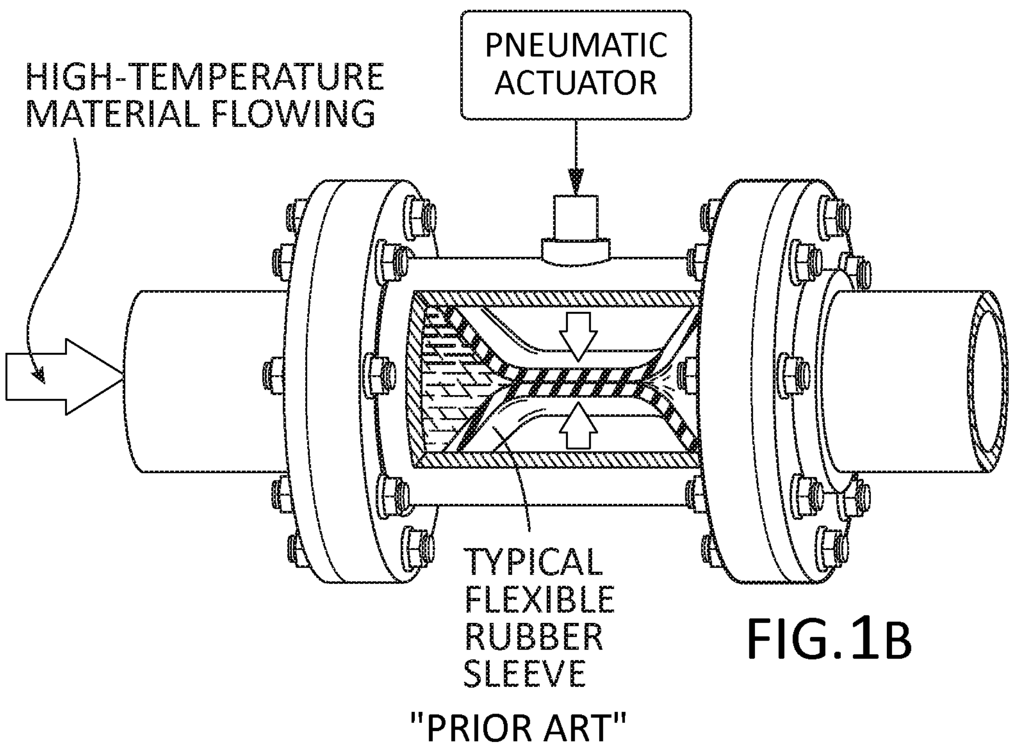
FIG. 1B is a schematic drawing of a pinch valve.
Figure 1C:
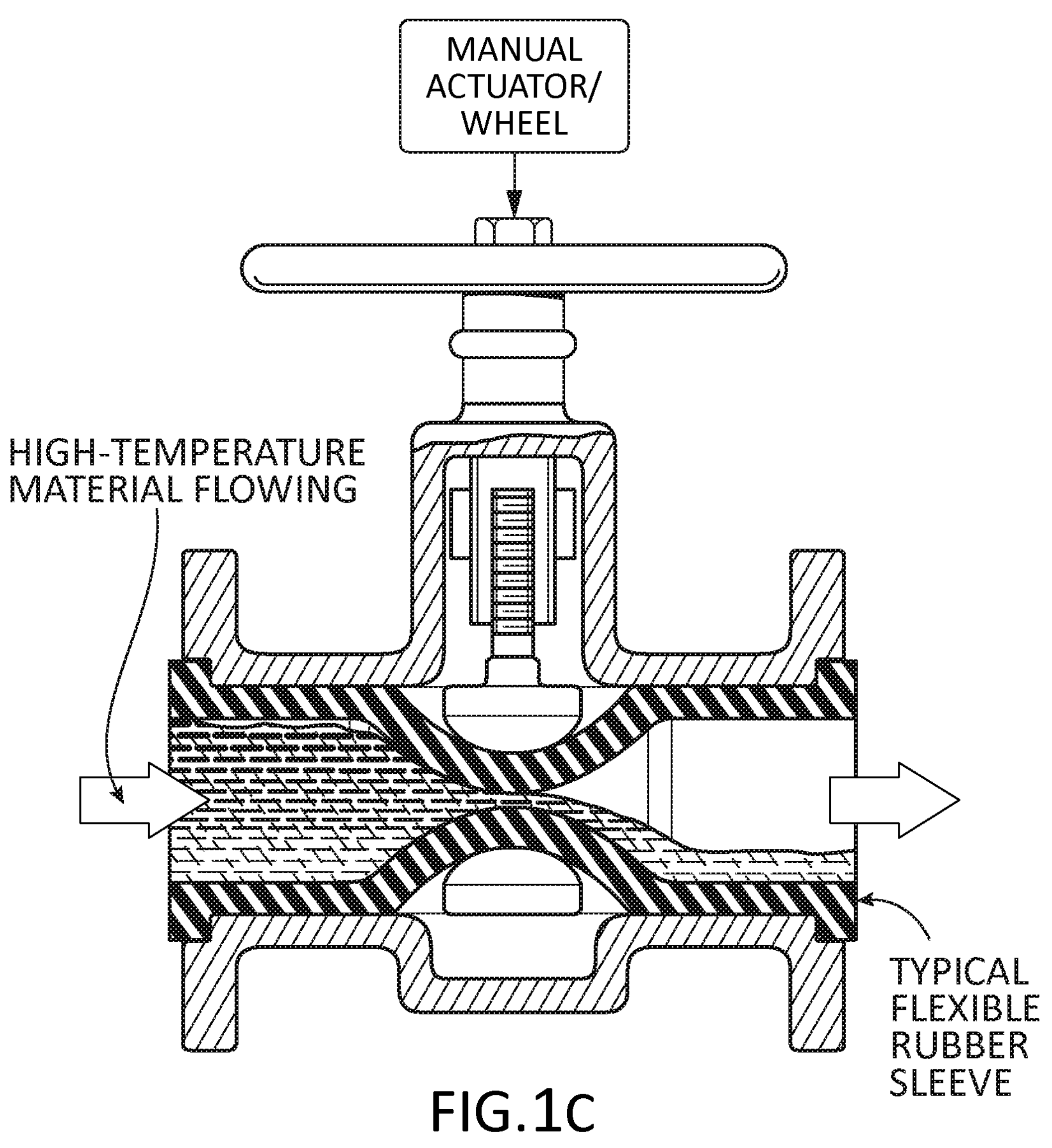
FIG. 1C is a schematic drawing of a pinch valve.

Embodiments described herein can be understood more readily by reference to the following detailed description, examples, and figures. Elements, apparatus, and methods described herein, however, are not limited to the specific embodiments presented in the detailed description, examples, and figures. It should be recognized that the exemplary embodiments herein are merely illustrative of the principles of the invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "5 to 10" or "5-10" should generally be considered to include the end points 5 and 10. Further, when the phrase "up to" is used in connection with an amount or quantity; it is to be understood that the amount is at least a detectable amount or quantity. For example, a material present in an amount "up to" a specified amount can be present from a detectable amount and up to and including the specified amount. Additionally, in any disclosed embodiment, the terms "substantially," "approximately," and "about" may be substituted with "within [a percentage] of" what is specified, where the percentage includes 0.1, 1, 5, and 10 percent.

The subject matter of aspects of the present disclosure is described with specificity herein to meet statutory requirements. However, the description itself is not intended to limit the scope of this patent. Rather, the inventor(s) have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps disclosed herein unless and except when the order of individual steps is explicitly described Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Device

A device is described herein. In some embodiments, the device is for use with high-temperature materials. The meaning of high-temperature materials is not so limited, but may include materials at or heated to a temperature of 200° C. or more, 300° C. or more, of 350° C. or more, of 400° C. or more, of 450° C. or more, of 500° C. or more, of 550° C. or more, of 600° C. or more, of 650° C. or more, of 700° C. or more, of 750° C. or more, of 800° C. or more, of 850° C. or more, of 900° C. or more, of 950° C. or more, of 1,000° C. or more, of 1,100° C. or more, of 1,200° C. or more, of 1,300° C. or more, of 1,400° C. or more, or 1,500° C. or more. The high-temperature material may include materials at or heated to a temperature up to 2,000° C., up to 2,500° C., or even up to 3,500° C.

In some embodiments, the device may be used in methods or processes involving high-temperature materials. For example, the device may be used in a casting process such as metal casting. As understood by those skilled in the art, casting is a process in which a liquid or molten metal or metal alloy is delivered into a mold. Metals commonly used in casting processes are aluminum (melting temperature of about 660° C., at standard temperature and pressure), tin (melting point 232° C., at standard temperature and pressure), lead (melting point of about 327° C., at standard temperature and pressure), zinc (melting temperature of about 420° C., at standard temperature and pressure), copper (melting temperature of 1,085° C., at standard temperature and pressure), and alloys thereof.

The device described herein, in some preferred embodiments, is a valve. As understood by those skilled in the art, valves include any number of mechanical devices by which the flow of fluids (e.g., liquids, gases, slurries, etc.) may be started, stopped, directed, or regulated by a movable part that opens, shuts, or partially obstructs one or more ports or passageways. There are many types of valves, e.g., ball valves, butterfly valves, check valves, gate valves, knife gate valves, globe valves, needle valves, and pinch valves. In some embodiments, the device described herein is a pinch valve. In a pinch valve, "pinching" and "un-pinching" or release of a rubber sleeve opens, shuts, or partially obstructs fluid flow. "Pinching" and "un-pinching" or release of a rubber sleeve may occur along a single point along the rubber sleeve or at multiple points. "Pinching" involves the application of pressure, e.g., mechanical pressure, air pressure, or the like, to the flexible sleeve. "un-pinching" of a typical rubber sleeve occurs when the applied pressure is lessened or removed. "un-pinching" occurs easily when pressure is lessened or removed due to the elastic behavior typical of rubber or elastomeric materials used in typical rubber flexible sleeves.

Typical pinch valves, comprise, consist of, or consist essentially of the following components: (1) a flexible rubber sleeve; (2) end connection ports; and (3) a body or housing.

The flexible rubber sleeve (also known as the rubber membrane, bladder, hose, tube, collar, diaphragm, etc.) is an important component of a pinch valve. As understood by those skilled in the art, the term "flexible" means that the sleeve can be repeatedly "pinched" and "un-pinched" or released to start, stop, direct, or regulate fluid flow through the valve. In the past, the flexible sleeve has been made from a rubber or elastomeric material. However, as explained above, these materials were not compatible for use with high-temperature materials. For example, flexible sleeves made from silicone, which may be used with steam, have a maximum operating temperature of 130° C. This makes them incompatible for use with high-temperature materials at a temperature of 200° C. or more. If such materials came in direct contact with the silicone sleeves, they would degrade, deform, and/or melt it. The shape of the flexible sleeve is not so limited. A common shape for the flexible sleeve is a tubular or substantially tubular shape, but other shapes are known. The term "substantially tubular" is used to describe sleeves having, for example, a sleeve that is tubular, but also flanged. The sleeve may be tubular with one or more flanges along a length of or at one or more ends of the tubular sleeve. In other embodiments, the term "substantially tubular" describes a tubular sleeve with notches or protrusions on a surface thereof. Such sleeves may be particularly useful in a mechanical pinch valve to receive the pinching device (e.g., a valve stem). Additionally, different types of flexible sleeves are known in the art. These include standard sleeves, cone sleeves, double wall sleeves, and high-pressure sleeves, i.e., sleeves designed for high-pressure ANSI 300 applications up to 720 psi.

A pinch valve's inlet and outlet ports are known as end connections or end connection ports. These ports are vital for the ingress and egress of fluids, which makes them an important component of the valve. The form of these ports is not so limited. They may take different forms allowing for the valve to adapt to different use conditions. Different types of end connections include the following: flanged end connections, threaded end connections, clamp-style end connections, and combinations thereof.

A pinch valves body or housing is also an important component of the pinch valve. The body or sleeve encompasses the sleeve and serves a protective and structural function. The material of the housing or body is selected based on how the pinch valve will be used. Some options for housing or body materials include the following: cast iron, stainless steel, ceramic, and aluminum.

A pinch valve typically also comprises, consists of, or consists essentially of an actuator in addition to the aforementioned structural components, i.e., the flexible sleeve, the end connection ports, and the body or housing. The actuator is directly or indirectly responsible for manipulating the sleeve by pinching and releasing it. This allows the pinch valve to start, stop, direct, and/or control the flow of fluids.

The type of actuator will depend on the type of pinch valve. Exemplary actuators include the following: a manual actuator; an electrical actuator; a solenoid actuator; a hydraulic actuator; a bevel gear actuator; hand-wheel actuators; double or single-acting pneumatic cylinder actuators; pneumatic actuators; hydraulic actuators; electro-hydraulic actuators;

Typically, in addition to the foregoing, a pinch valve also comprises, consists of, or consists essentially of a controller. The controller typically operates according to an electronic or pneumatic control mechanism. The controller controls the valves opening and closing according to user input. The controller controls when and to what extent the flexible sleeve is pinched.

The device described herein comprises, consists of, or consists essentially of the following components: (1) a flexible sleeve; and (2) two end connection ports. One of the two end connection ports is located on each end of the flexible sleeve. They are located on opposite ends of the flexible sleeve and may be substantially aligned along an axis of the flexible sleeve. In some embodiments, the two end connection ports may be integrally connected to the flexible sleeve. In other embodiments, the end connection ports are not integrally connected to the flexible sleeve.

In further embodiments, the device may further comprise, consist of, or consist essentially of an actuator. The actuator is capable of directly or indirectly applying and/or configured to directly or indirectly apply pressure to the flexible sleeve (e.g., pinching the flexible sleeve) to start, stop, direct, or control the flow of a fluid through the flexible sleeve.

In further embodiments, in addition to the flexible sleeve, the two end connection ports, and the actuator, the device may further comprise, consist of, or consist essentially of a controller.

In further embodiments, the device may further comprise, consist of, or consist essentially of an actuator (3). The actuator is capable of directly or indirectly applying and/or configured to directly or indirectly apply pressure to the flexible sleeve (e.g., pinching or throttling the flexible sleeve) to start, stop, direct, or control the flow of a fluid through the flexible sleeve.

In further embodiments, the device may further comprise, consist of, or consist essentially of a heating element (4).

In further embodiments, the device may further comprise, consist of, or consist essentially of a housing or body (5).

In further embodiments, in addition to the flexible sleeve, the two end connection ports, and the actuator, the device may further comprise, consist of, or consist essentially of a controller.

Below, each element of the device is described in further detail.

(1) Flexible Sleeve

The flexible sleeve of the device described herein is not so limited. The term "flexible," as used herein, is consistent with the use of the term when describing the, typically rubber, sleeve of a pinch valve. The flexible sleeve is capable of being and/or configured to be repeatedly "pinched" and "un-pinched" or released to start, stop, direct, or regulate fluid flow through the valve. However, unlike the rubber flexible sleeves used in typical pinch valves, the flexible sleeves described herein do not typically exhibit elastic behavior or elasticity, which allows them to bounce back when pressure on the sleeve is lessened or removed. Due to this difference, in some embodiments, un-pinching of the inventive flexible sleeve may have to be done mechanically or by material back pressure associated to the internal partial or liquid alloy.

Unlike the rubber flexible sleeves typically used in pinch valves, the flexible sleeve described herein is capable of having and/or configured to have a high-temperature fluid material come in direct contact with it without being degraded, deformed, oxidized, and/or melted. A high-temperature material can flow through the flexible sleeve, at least once, without degrading, deforming, and/or melting the sleeve. Maximum operating temperature for typical rubber sleeves do not exceed 130° C., and therefore, those sleeves would be incompatible for use with the high-temperature materials as described herein.

The meaning of high-temperature materials is not so limited, but may include materials at or heated to a temperature of 200° C. or more, 300° C. or more, of 350° C. or more, of 400° C. or more, of 450° C. or more, of 500° C. or more, of 550° C. or more, of 600° C. or more, of 650° C. or more, of 700° C. or more, of 750° C. or more, of 800° C. or more, of 850° C. or more, of 900° C. or more, of 950° C. or more, of 1,000° C. or more, of 1,100° C. or more, of 1,200° C. or more, of 1,300° C. or more, of 1,400° C. or more, or 1,500° C. or more, up to 3,500° C. In some instances, the high-temperature material may be molten metal or molten metal alloys, including molten metals or molten metal alloys used in a casting process. Metals commonly used in casting processes are aluminum (melting temperature of about 660° C., at standard temperature and pressure), tin (melting point 232° C., at standard temperature and pressure), lead (melting point of about 327° C., at standard temperature and pressure), zinc (melting temperature of about 420° C., at standard temperature and pressure), copper (melting temperature of 1,085° C., at standard temperature and pressure), and alloys thereof.

In some embodiments, the flexible sleeve may only be capable of having and/or configured to have a high-temperature material flow through it a limited number of times before the sleeve needs to be regenerated or discarded. For example, the flexible sleeve may only be capable of having and/or configured to have a material flow through it 5 times or less, 4 times or less, 3 times or less, or 2 times or less. In examples where the high-temperature material is molten metal or molten metal alloy, metal may accumulate in or on the sleeve making it stiff, and/or otherwise limiting the ability to reuse the flexible sleeve.

The material that the flexible sleeve is made of is not so limited. However, the flexible sleeve of the device described herein do not typically include the rubber or elastomeric materials, as described herein, that the flexible sleeves of pinch valves are typically made of. As described above, these materials would be degraded, deformed, oxidized, and/or melted by the high-temperature materials that the device claimed herein is used with. Examples of materials that could be used to form the flexible sleeve described herein include at least one of silica-fiber-containing material, a glass-fiber-containing material, a carbon-fiber-containing material, an aramid-fiber-containing material, a PEEK (polyether ether ketone)-fiber-containing material, and PFA (perfluoroalkoxy)-fiber-containing material. In some embodiments, the flexible sleeve may be formed from a braided and/or woven material including braided and/or woven silica fibers, glass fibers, carbon fibers, aramid fibers, PEEK fibers, or any combination of the foregoing fibers, e.g., a weave of silica fiber and carbon fiber. Examples of commercially available products for use as the flexible sleeve include, but are not limited to PEEK braided cable sleeving available from TECHFLEX® (operating temperatures as high as 260° C., PFA braided cable sleeving available from TECHFLEX® (operating temperatures as high as 280° C.), Tetraglas® and Tetraglas 3000® sleeves available from DARCO Southern (operating temperatures as high as 980° C.), high temperature sleeves available from DARCO Southern (operating temperature up to 1090° C., depending on the product), braided high-temperature sleeving available from HellermannTyton, Zetex® fiberglass sleeves from NEWTEX (operating temperatures up to 1095° C. for the vermiculite-coated option). Small amounts of rubber or elastomeric material may be added.

In other embodiments, the flexible sleeve may be made of a non-wetting ceramic material. The term "non-wetting" as used herein, refers to the fact that the non-wetting ceramic material is not wet by the high-temperature material, e.g., the molten metal or metal alloy. For example, the non-wetting ceramic is not wet by molten aluminum/no wetting occurs when molten aluminum comes into contact with the non-wetting ceramic. Non-wetting refers to instances where a contact angle of about 140° to about 180° exists when the high temperature material is place on a surface of the non-wetting ceramic material. An example of a non-wetting ceramic material that may be used is laser zirconium yttrium modified. In some embodiments, that flexible sleeve may be formed by 3D printing the non-wetting ceramic material with or without a binder. For example, a woven structure may be 3D-printed. Any 3D-printing method may be utilized, e.g., a binder jet process, a selective laser sintering (SLS) process, a direct metal laser sintering (DMLS) process, an electron beam melting (EBM) process, and the like. Skilled artisans would understand how to adjust the weave of the 3D printed woven structure so that high temperature material does not leak through it.

A benefit of using a non-wetting ceramic material to form the flexible sleeve is that the afore described accumulation of solidified material on the flexible sleeve may be reduced or eliminated. If material does accumulate, it will be easier to remove due to the non-wetting nature of the ceramic material. Use of non-wetting ceramic materials to form the flexible sleeve may allow the sleeve to be used with longer duration, e.g., hundreds of times, thousands of times, tens of thousands of times, or hundreds of thousands of times.

Figure 4:
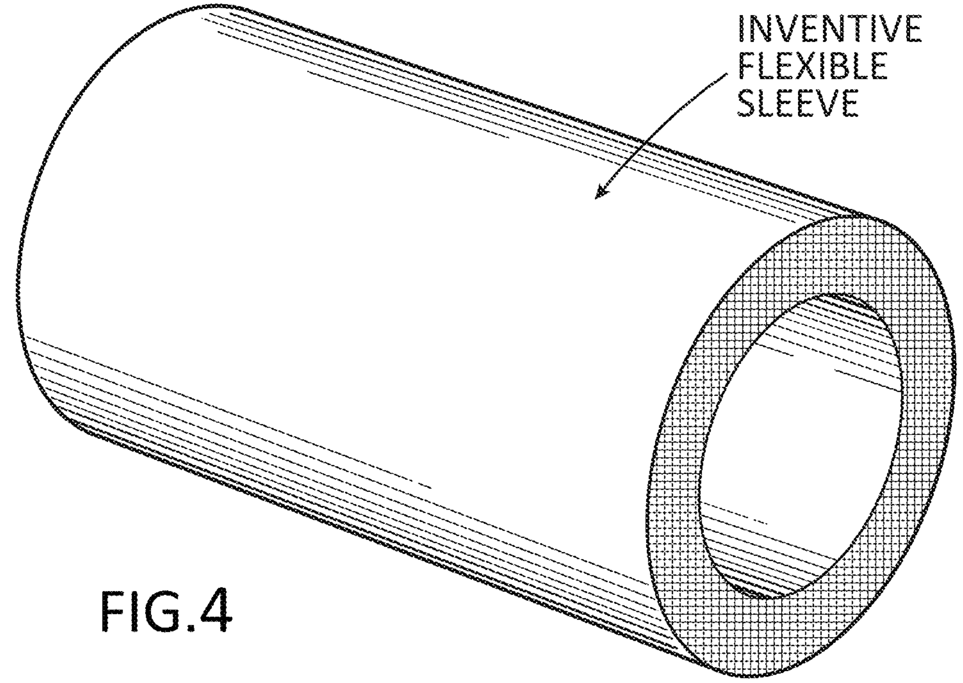
FIG. 4 is a schematic drawing of an inventive flexible sleeve according to some embodiments described herein.

As described above, the inventive flexible sleeve typically does not include rubber or elastomeric materials, and the braided and/or woven material may be porous. Due to the lack of rubber or elastomeric material, these inventive sleeve are not expected to exhibit elastic behavior that allows them to bounce back when pressure on the sleeve is lessened or removed, like a typical rubber sleeve would. Additionally, due to the porous nature of these flexible sleeves, which are made from braided and/or woven materials, it may be difficult to apply pneumatic pressure to pinch (and apply a vacuum to un-pinch) the sleeve. To solve these issues, in some embodiments, the inventive flexible sleeve may be provided as a composite in which the inventive flexible sleeve is provided inside or within a typical flexible rubber sleeve so that the sleeves are coaxial. The inventive sleeve may be provided inside and connected to an inner surface of a typical rubber sleeve. FIG. 4 depicts composite comprising the inventive flexible sleeve provided inside and attached (means of attachment not pictured) to an inner surface of a typical rubber sleeve. The inventive flexible sleeve may be attached to the inner surface of a typical rubber sleeve by any acceptable means. These include, but are not limited to, adhesives and mechanical fasteners. In some embodiments, a thermally insulating adhesive may be used. The insulating adhesive helps prevent heat loss from the high-temperature material in the sleeve. It also may prevent transfer of heat to the typical rubber sleeve, thereby preventing it from being softened, deformed, or melted by said heat.

As another way to address problems arising due to the porous nature of sleeves made from braided and/or woven materials, a composite may be provided in which a non-porous coating is provided on an outer surface of such sleeves. For example, a rubber-coating may be provided on an outer surface of such sleeves.

(a) Insulative or Exothermic Material

In some embodiments, the flexible sleeve may be surrounded or partially surrounded by at least one of the following: an insulative material, an exothermic material, and a combination of an insulative material and an exothermic material. The insulative material, the exothermic material, or both may or may not be in direct contact with the flexible sleeve.

In preferred embodiments, the insulative material may be a heat-insulating material with or without a binder. For example, the heat-insulating material may be a material used to form an insulating riser sleeve used in a casting process. In some embodiments, the heat-insulating material may comprise, consist of, or consist essentially of refractory materials. Exemplary refractory materials may include, alumina, silica sand, olivine sand, and mixtures thereof. In some embodiments, the heat-insulating material may be fly ash. Providing the heat-insulating material around the flexible sleeve may help to prevent loss from the high-temperature material. This will help prevent or minimize the cooling and solidification of the high-temperature material.

In some embodiments, the exothermic material is a material that comprises, consists of, or consists essentially of an oxidizable metal, an oxidizer, and optionally, a binder. In some embodiments, the oxidizable metal may be aluminum and the oxidizer may be iron oxide, manganese oxide, or combinations thereof. An exothermic material may release heat and help mitigate cooling and solidification of the high-temperature material.

The combination of exothermic material and insulative material is not so limited. In some embodiments, the combination material comprises, consists of, or consists essentially of a heat-insulating material, an oxidizable metal, an oxidizer, and optionally, a binder. Heat-insulating materials, oxidizable metals, oxidizers, and binders are as described hereinabove.

Figure 8A:
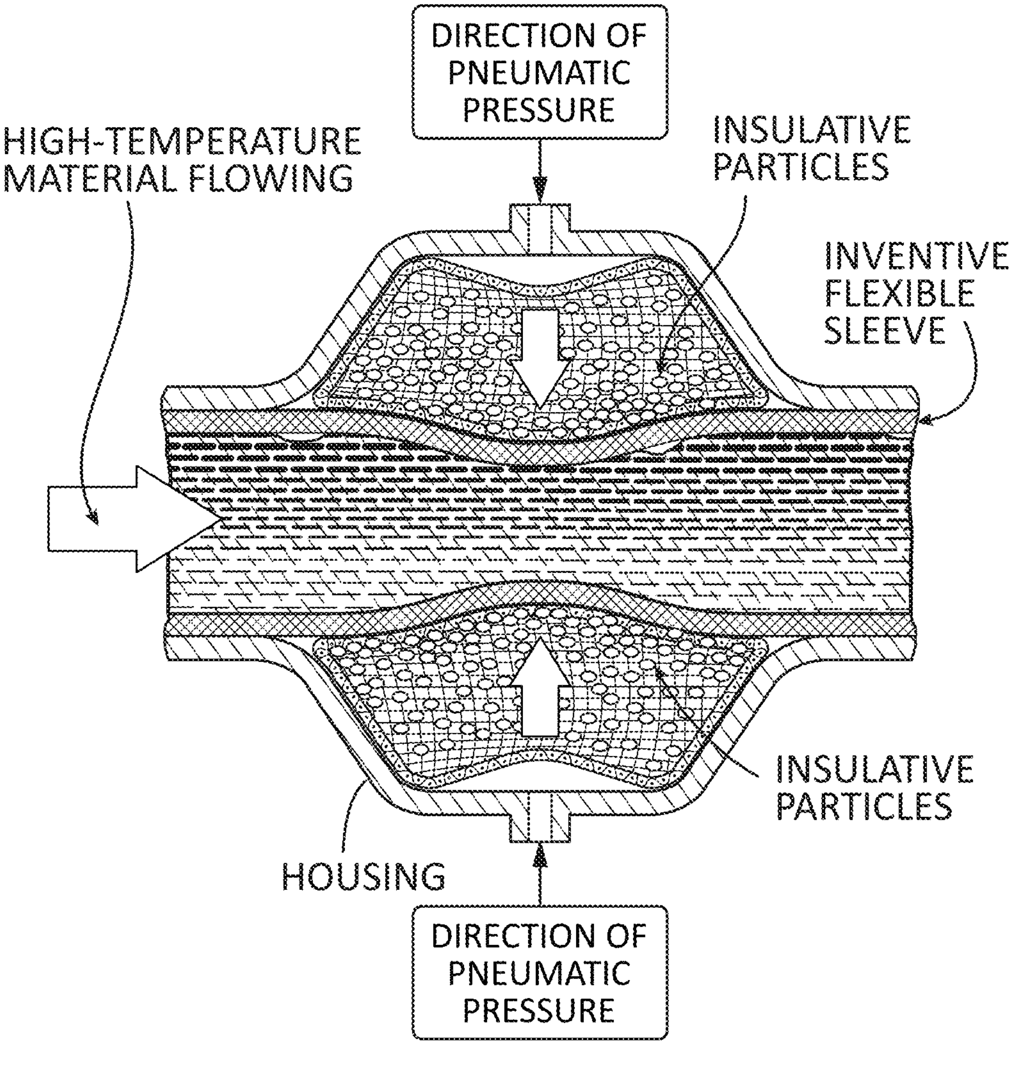
FIG. 8A and FIG. 8B are schematic drawings of a device according to some embodiments described herein, including the inventive flexible sleeve of FIG. 4.
Figure 8B:
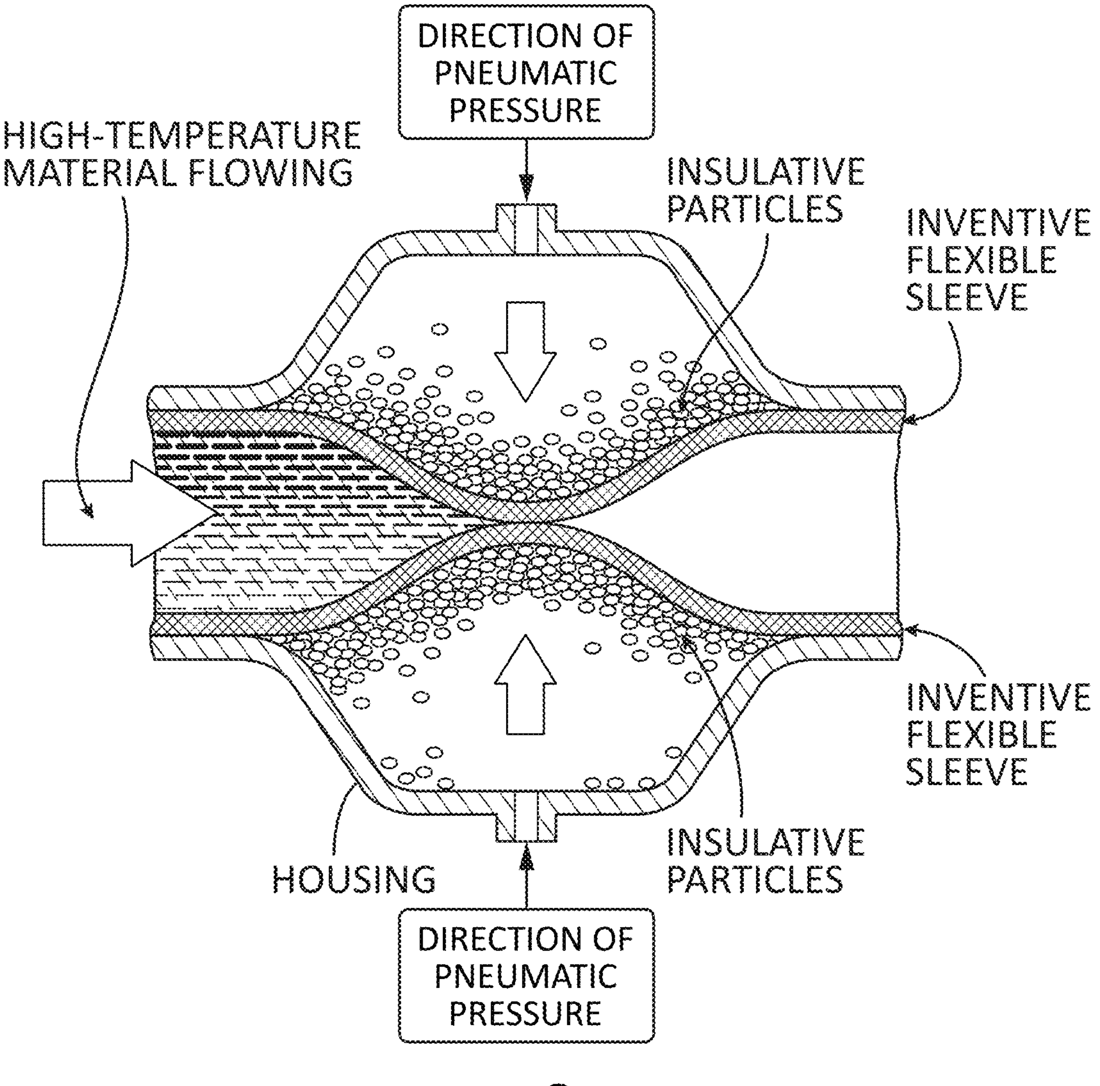

In some embodiments, the insulative material, the exothermic material, or the combination material (insulative and exothermic) are particulate materials. For example, they may be an insulative particulate material, an exothermic particulate material, or an insulative and exothermic (combination) particulate material. In some embodiments, the particulate material may be contained, and then provided around all or a part of the inventive flexible sleeve. For example, the particulate material may be contained within a mesh material that has proper heat resistance. High-temperature mesh materials made of fiberglass, Incoloy, Inconel, Nichrome, Hastelloy, Kanthal, tungsten, or the like may be appropriate. FIG. 8A shows a cross-sectional view of a device where the particulate material is contained by a mesh. In other embodiments, the particulate material may be provided directly into the device. FIG. 8B shows a cross-sectional view of a device where the particulate material, e.g., a particulate insulative material, is provided directly into the device via an opening in the device (not depicted) and not contained by a mesh. This embodiment may be preferred when the user wants to easily add into and/or remove material from device without disassembling the housing. For example, in the case of adding exothermic material, which may not be reusable and may need to be replaced, this embodiment may be preferred.

Use of a contained or uncontained particulate material is preferred to use of non-particulate material. Voids between the particles allow for the application of pressure, e.g., pneumatic pressure, to the inventive sleeve to "pinch" it. For example, pneumatic pressure may be applied to the flexible sleeve through the contained or uncontained particulate material. The packing of the contained or uncontained particulate material must be controlled so that pressure may be effectively applied to the flexible sleeve through the contained or uncontained particles. If the particles are too densely packed, it may be difficult to apply pressure to the flexible sleeve through them. The particulate material morphology is preferred to be round to enable movement but is not required.

(2) Two End Connection Ports

Figure 2:
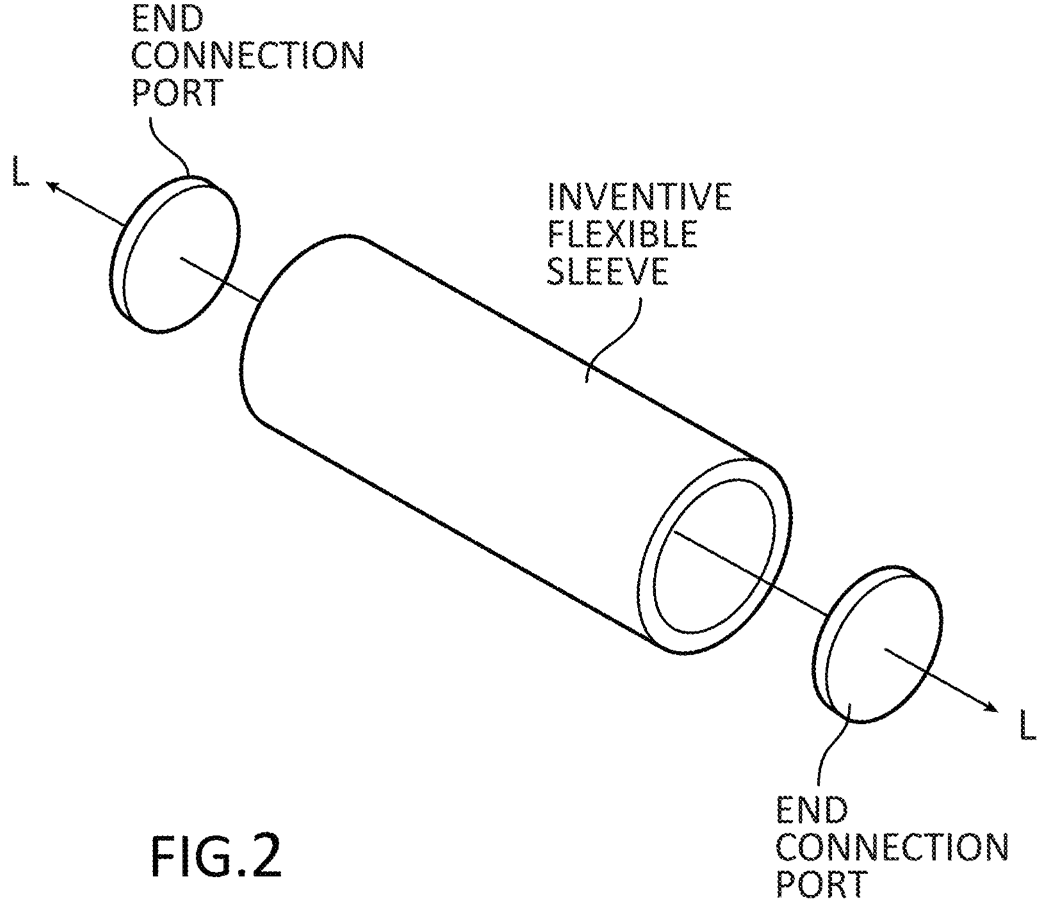
FIG. 2 is a schematic drawing of a device according to some embodiments described herein.

The two end connection ports are not so limited, so long as they enable flow of the high-temperature material into and out of the sleeve. In some embodiments, the two end connection ports are integrally connected to the flexible sleeve, and in some embodiments they are separable pieces. The two end connection ports, in some preferred embodiments, are located at opposite ends of the flexible sleeve. In some embodiments, the two end connection ports are present at opposite ends of the flexible sleeve and substantially aligned along a longitudinal axis of the sleeve. FIG. 2 depicts the arrangement of the two end connection ports on opposite ends of the flexible sleeve and shows their alignment along the longitudinal axis (L) of the flexible sleeve.

Like in a typical valve or pinch valve, the end connection ports also allow the device to connect to other components or devices. For example, they may allow the device to connect to piping, to a mold cavity, to the ceramic, metal, fiberglass, or rubber of a casting system, to another of the same device, and the like.

In some embodiments, the two end connections ports may be selected, independently, from the following: threaded connections (e.g., NPT-national pipe thread tapered, BSPT-British standard pipe taper threads, BSPP-British standard parallel pipe threads); welded connections (e.g., socket welded and butt weld); soldered or sweat connections; glued connections; flanged connections (e.g., ANSI flange (lugged style), ANSI flange (wafer style), tri-clamp, and SAE 4-bolt flanges); compression connections (traditional, push-in, and barbed-hose connections); and union/true union connections.

(3) Actuator

As understood by those skilled in the art, an actuator is a component of a device that produces a force, a torque, a displacement, or the like, usually in a controlled way. In a valve, the actuator is the component that actuates, e.g., opens and closes, the valve. In a pinch valve, the actuator is a component that, for example, opens and closes the valve by applying direct or indirect pressure to the flexible sleeve, e.g., by pinching and un-pinching the flexible sleeve. The flexible sleeve may be pinched and un-pinched to control the flow of fluid, e.g., the high temperature material, through the flexible sleeve. The flow of fluid may be started, stopped, controlled, or directed by the pinching and un-pinching.

Figure 3:
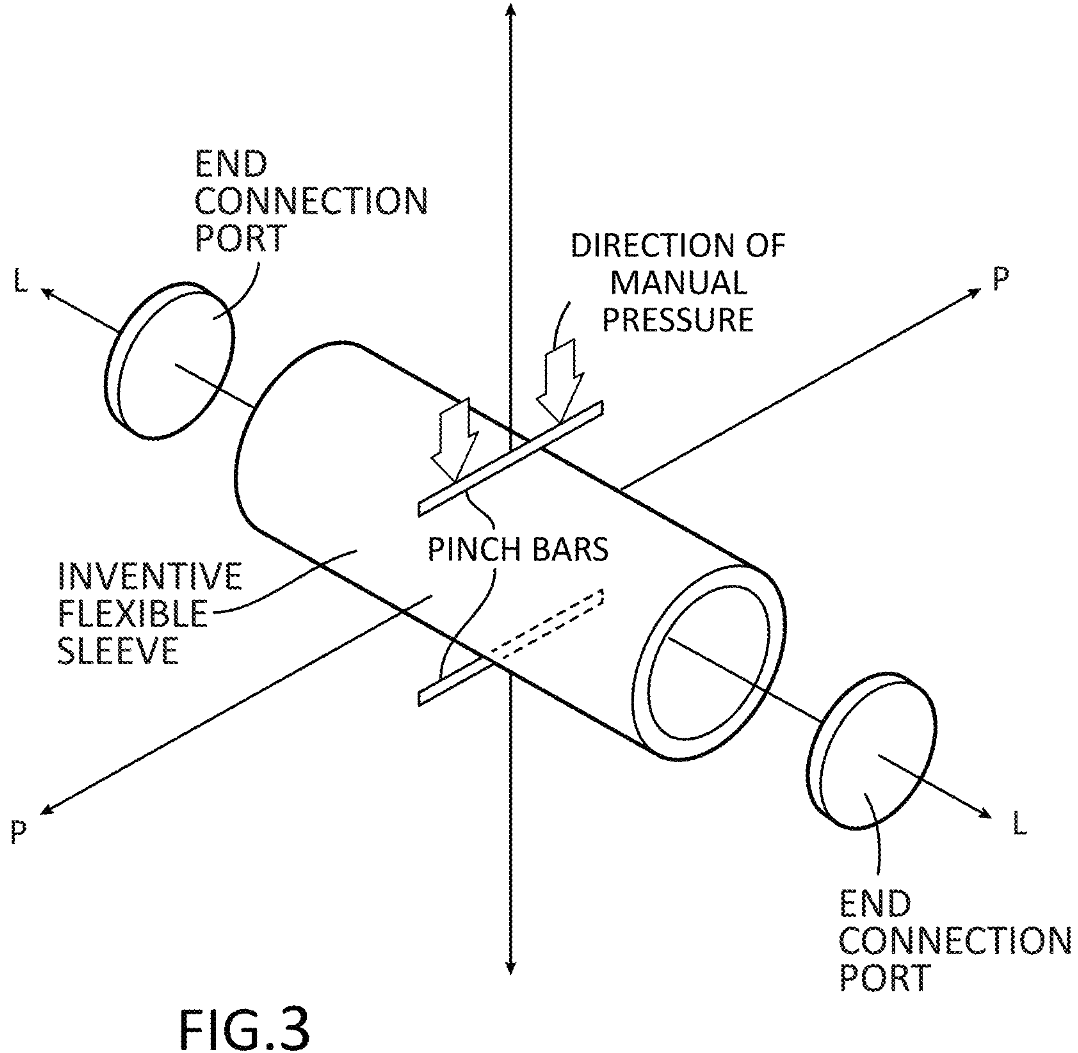
FIG. 3 is a schematic drawing of a device according to some embodiments described herein.

The type of actuator is not so limited. In some embodiments, the actuator may be a manual actuator. Manual actuators utilize levers, gears, or wheels to enable opening and closing of a valve. For example, in such embodiments, two pinch bars may be positioned at a location along longitudinal length of the flexible sleeve. The bars are arranged opposite to one another (e.g., above and below the flexible sleeve) and perpendicular to a longitudinal axis of the flexible sleeve. FIG. 3 depicts a positioning of the two pinch bars above and below the flexible sleeve. It also shows the bars being perpendicular to a longitudinal axis (L) of the flexible sleeve. The bars are parallel to axis (P), which is perpendicular to a longitudinal axis (L) of the flexible sleeve. In such embodiments, for example, turning of a hand wheel may cause the pinch pars to pinch or un-pinch the sleeves, depending on the direction in which the wheel is turned.

In other embodiments, the actuator may be an automatic actuator. Automatic actuators use an external power source to provide the necessary force to operate the valve. Automatic actuators may use hydraulic, pneumatic, or electrical power as their source for operating the valve.

(4) Heating Element

In some embodiments, heating elements may be provided as part of the device to help maintain the temperature of the high-temperature material in the device. This is important. It may help stop or mitigate cooling and solidification of the high-temperature material. Solidified material may accumulate in or on the sleeve making it stiff, and limiting the ability to reuse the flexible sleeve.

The type of heating element is not so limited. In some embodiments, the heating element may be selected from: electric heaters; reflective heaters; infrared heaters; fan heaters; micathermic heaters; convection heaters; ceramic heaters, and the like.

(5) Housing or Body

The housing or body serves a structural and/or protective function. It surrounds the flexible sleeve in a typical pinch valve. The material used to form the body or housing will typically depend on how the device is used. Some options for housing or body materials include the following: cast iron, stainless steel, and aluminum.

In some embodiments, heating elements may be provided on an interior surface of the housing or body. Heating elements help maintain the temperature of the high-temperature material in the device. This is important. It may help stop or mitigate cooling and solidification of the high-temperature material. Solidified material may accumulate in or on the sleeve making it stiff, and limiting the ability to reuse the flexible sleeve.

Method 1

In another aspect, a method is described herein. The method may comprise, consist of, or consist essentially of at least the following two steps: (1) providing a flexible sleeve as described herein above; and (2) flowing a high-temperature material into the flexible sleeve such that the high-temperature material comes into direct contact with the flexible sleeve. The high-temperature material, as described hereinabove, is a material at a temperature of 200° C. or more. The flexible sleeve is capable of having and/or configured to have the high-temperature material be flowed into it and capable of having and/or configured to have the high-temperature material be in direct contact with it. This means that the flexible sleeve is not degraded, deformed, oxidized, and/or melted by the high-temperature material. In some embodiments, the steps described herein may be part of a casting method, e.g., a metal casting method. The steps are discussed in further detail below.

(1) Providing a Flexible Sleeve

A flexible sleeve as described herein may be provided by itself or as part of a device as described herein. In some preferred embodiments, the flexible sleeve is provided as part of a device, and the device is a valve. In some particularly preferred embodiments, the flexible sleeve is provided as part of a device, and the device is or functions like a pinch valve.

In some embodiments, providing a flexible sleeve involves providing two or more, three or more, four or more five or more, six or more, seven or more, eight or more, nine or more, or ten or more flexible sleeves or devices comprising the same. In some embodiments, two or more flexible sleeves, or devices comprising the same, may be provided in series. In some embodiments, two or more flexible sleeves, or devices comprising the same, may be provided in parallel.

When the method is a casting method, the step of providing a flexible sleeve may involve replacing a riser (also known as a feeder), typically used in such processes, with the flexible sleeve or a device comprising the same. In some embodiments, the flexible sleeve or a device comprising the flexible sleeve may be provided along or connected to a sprue or down sprue of a casting process. In some embodiments, the flexible sleeve or a device comprising the flexible sleeve may be provided along or connected to a runner. In some embodiments, the flexible sleeve or a device comprising the same may be provided along a runner. In some embodiments, the providing the flexible sleeve or a device comprising the same may involve connecting the same to a mold package.

(2) Flowing a High-Temperature Material into the Flexible Sleeve

The step of flowing the high-temperature material into the flexible sleeve is not so limited. The high-temperature material may be a fluid (i.e., liquid, gas, etc.) capable of flowing or that flows. When the high-temperature material flows into the flexible sleeve, it comes into direct contact with the flexible sleeve. After the high-temperature material flows into the flexible sleeve, it may remain in the flexible sleeve for a period of time, or it may exit the flexible sleeve. Entry and exit of the high-temperature material into and out of the flexible sleeve may occur via two end connections as described herein.

In embodiments where a riser (also known as a feeder) is replaced by a flexible sleeve (or a device comprising the same) as described herein, high-temperature material may flow into, but not through the flexible sleeve.

Method 2

In other embodiments, the method may comprise, consist of, or consist essentially of the following two steps: (1) providing a flexible sleeve as described herein above; and (2) flowing a pre-determined amount of a high-temperature material, into and through the flexible sleeve to complete a run. Here to, the high-temperature material, as described hereinabove, is a material at a temperature of 200° C. or more. The flexible sleeve is capable of having and/or configured to have the high-temperature material be flowed into it and through it. The flexible sleeve is also capable of having and/or configured to have the high-temperature material be in direct contact with it. This means that the flexible sleeve is not degraded, deformed, oxidized, and/or melted by the high-temperature material.

The steps are discussed in further detail below.

(1) Providing a Flexible Sleeve

The step of providing a flexible sleeve in method 2 is the same or substantially the same as in claim 1.

(2) Flowing a Pre-Determined Amount of a High-Temperature Material into and Through the Flexible Sleeve to Complete a Run.

This step is not so limited, and may involve flowing a pre-determined amount of a high-temperature material through a flexible sleeve to complete five runs or less, four runs or less, three runs or less, two runs or less, or only one run. The number of runs may be limited to five runs or less due to build-up of solidified material on or in the flexible sleeve. This accumulation of material may make the sleeve stiff and no longer a flexible sleeve capable of being and/or configured to be pinched.

After five runs, four runs, three runs, two runs, or one run, the flexible sleeve may need to be discarded or regenerated. The regeneration process may involve removing the accumulated solid material from the sleeve so that it is a flexible sleeve capable of being and/or configured to be pinched again. Regeneration may be done by any known method, including scraping, melting out the material, soaking in a solvent or solution, etc.

A pre-determined of high-temperature material would be understood by those skilled in the art to mean, for example, an amount of high-temperature material, e.g., molten metal or a molten metal alloy, necessary to fill a mold or a desired number of molds in a casting process.

EXAMPLES

Figure 5A:
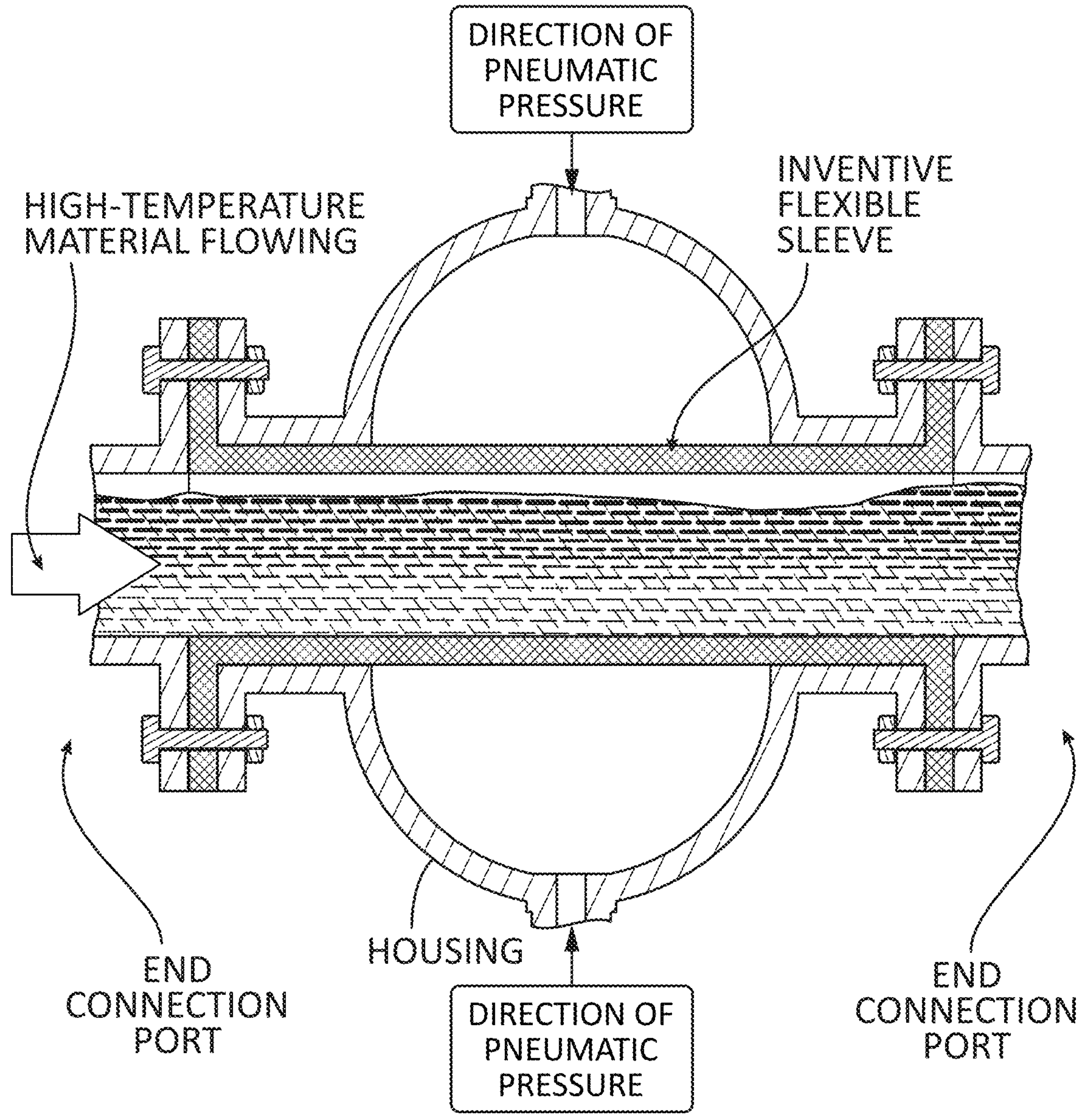
FIG. 5A and FIG. 5B are schematic drawings of a device according to some embodiments described herein, showing an un-pinched (FIG. 5A) and pinched (FIG. 5B) inventive flexible sleeve of FIG. 4.
Figure 5B:
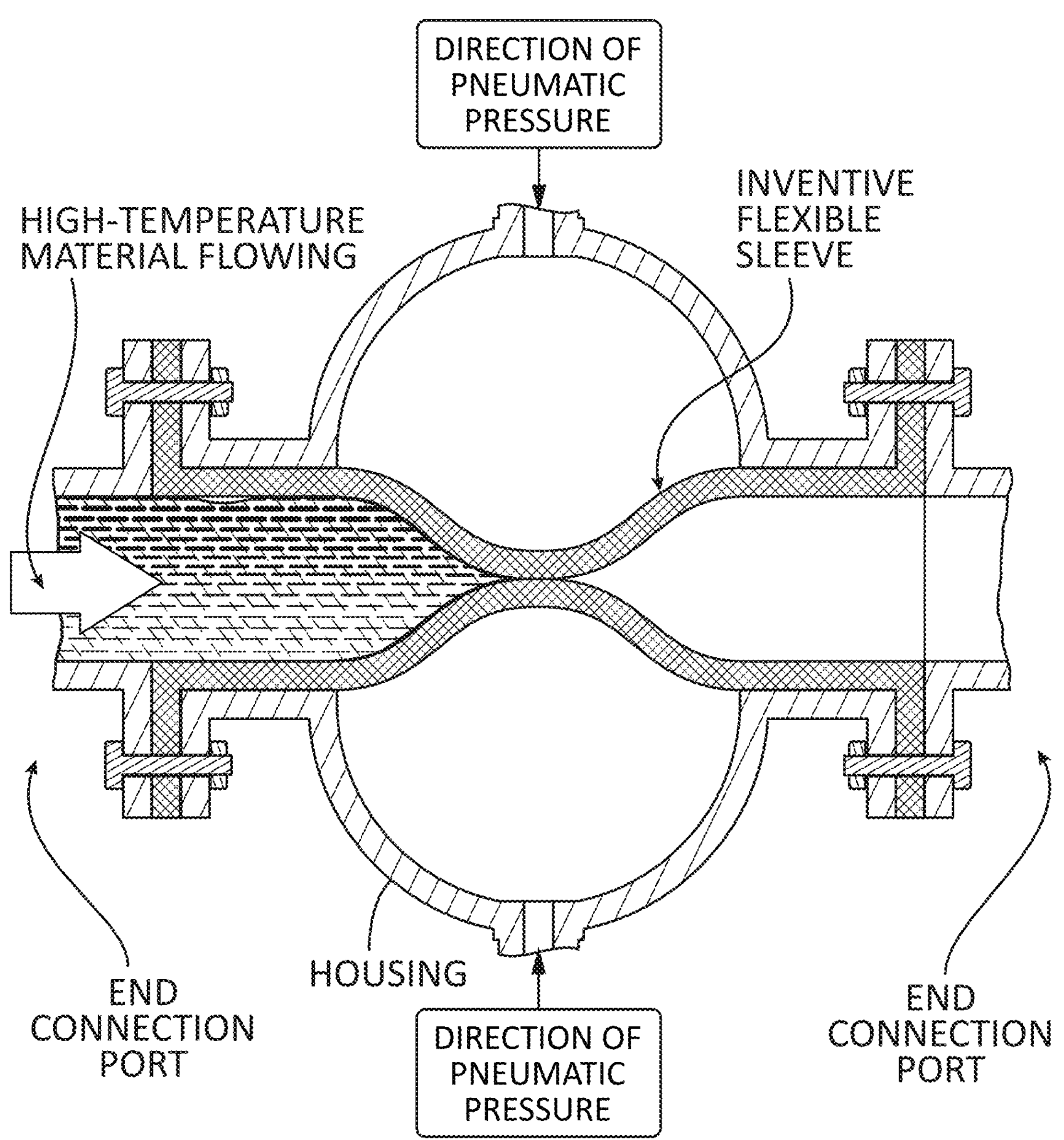

Example 1—In Example 1, an inventive flexible sleeve that is made out of a woven fiberglass material is provided, and molten aluminum is flowed through the inventive flexible sleeve. FIG. 4 is a schematic drawing of an inventive flexible sleeve as described herein. FIGS. 5A and 5B depict use of the inventive flexible sleeve of FIG. 4 with a high-temperature material, e.g., molten aluminum.

Figure 6:
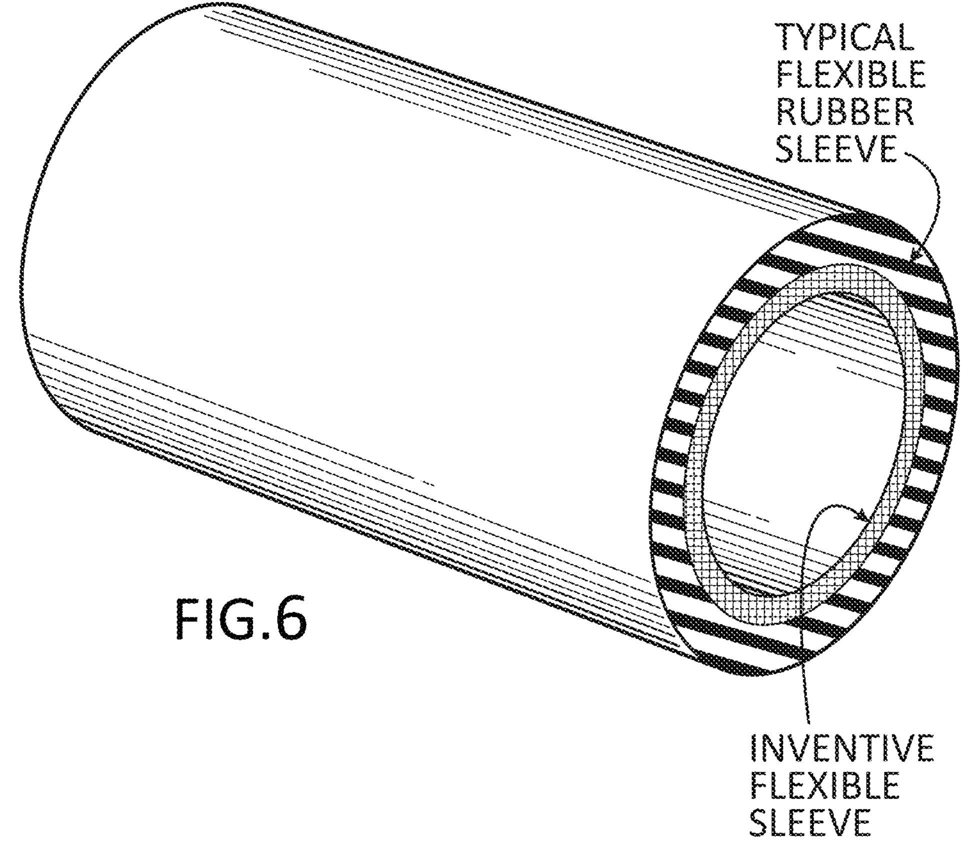
FIG. 6 is a schematic drawing of an inventive flexible sleeve according to some embodiments described herein.

Example 2—In Example 2, the inventive flexible sleeve of Example 1 is provided with a non-porous rubber coating on an outer external surface thereof. The resulting coated inventive flexible sleeve will look like FIG. 6, except that the typical flexible rubber sleeve will be replaced with a non-porous rubber coating. Due to the non-porous nature of the rubber coating, pneumatic pressure may be used to pinch the sleeve. Also, due to the presence of the rubber coating, bounce back should occur when pressure is reduced or removed.

Figure 7A:
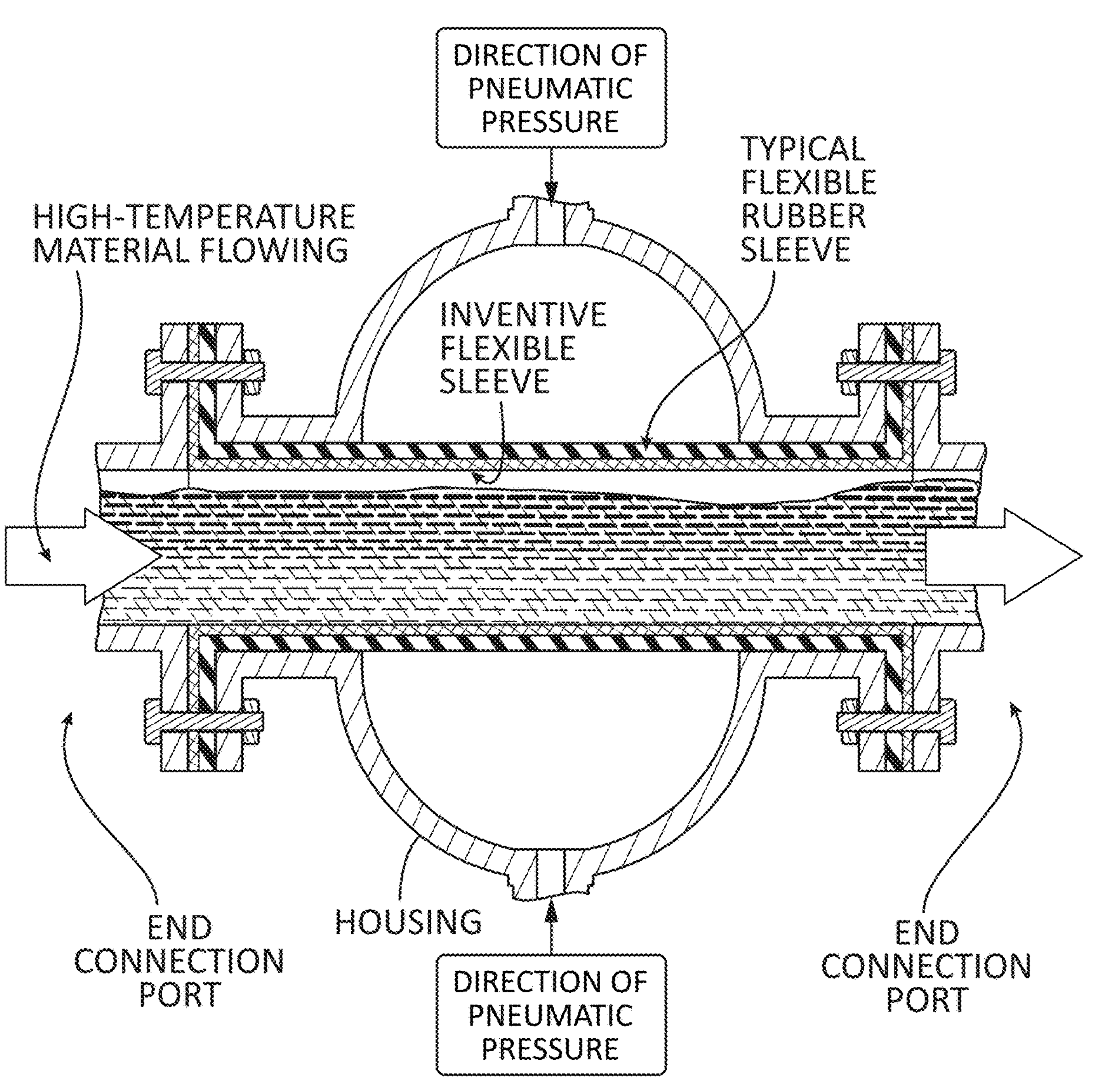
FIG. 7A and FIG. 7B are schematic drawings of a device according to some embodiments described herein, showing an un-pinched (FIG. 7A) and pinched (FIG. 7B) inventive flexible sleeve of FIG. 6.
Figure 7B:
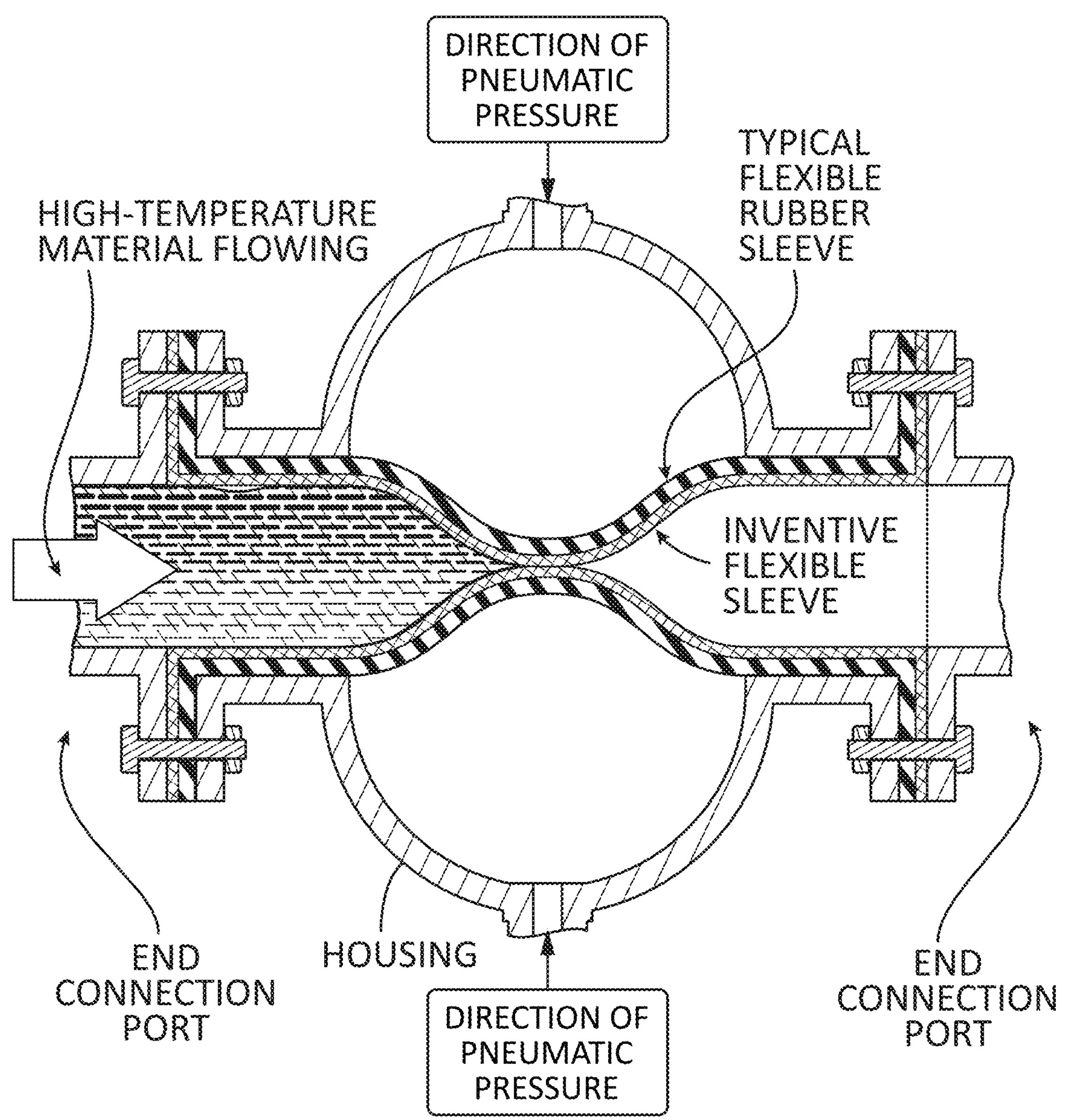

Example 3—In Example 3, the inventive flexible sleeve of Example 1 is provided inside a typical rubber sleeve and connected to an interior surface of the rubber sleeve via an adhesive. See FIG. 6, which is a cross-section view of the sleeve within a sleeve (adhesive not depicted). Molten aluminum is flowed through the inventive flexible sleeve provided inside a typical rubber sleeve. Due to the non-porous nature of the rubber sleeve, pneumatic pressure may be used to pinch the sleeve. Also, due to the presence of the typical rubber sleeve, bounce back should occur when pressure is reduced or removed. FIGS. 7A and 7B depict use of the sleeve within a sleeve of FIG. 6 with a high-temperature material, e.g., molten aluminum.

Example 4—In Example 4, insulative particles are provided around the inventive flexible sleeve of Example 1. The insulative particles are not contained. See FIG. 8B, which shows the high-temperature material being restrained by the pinched inventive flexible sleeve. The insulative particles (e.g., fly ash) are packed around the inventive flexible sleeve to prevent heat loss through the inventive flexible sleeve, and consequent cooling and hardening of the high-temperature material.

Example 5—In Example 5, insulative particles are provided around the inventive flexible sleeve of Example 1. The insulative particles (e.g., fly ash) are contained in a mesh. See FIG. 8A, which shows the contained insulative particles acting to prevent heat loss through the inventive flexible sleeve, and consequent cooling and hardening of the high-temperature material. The insulative particles may be fly ash particles.

Figure 9:
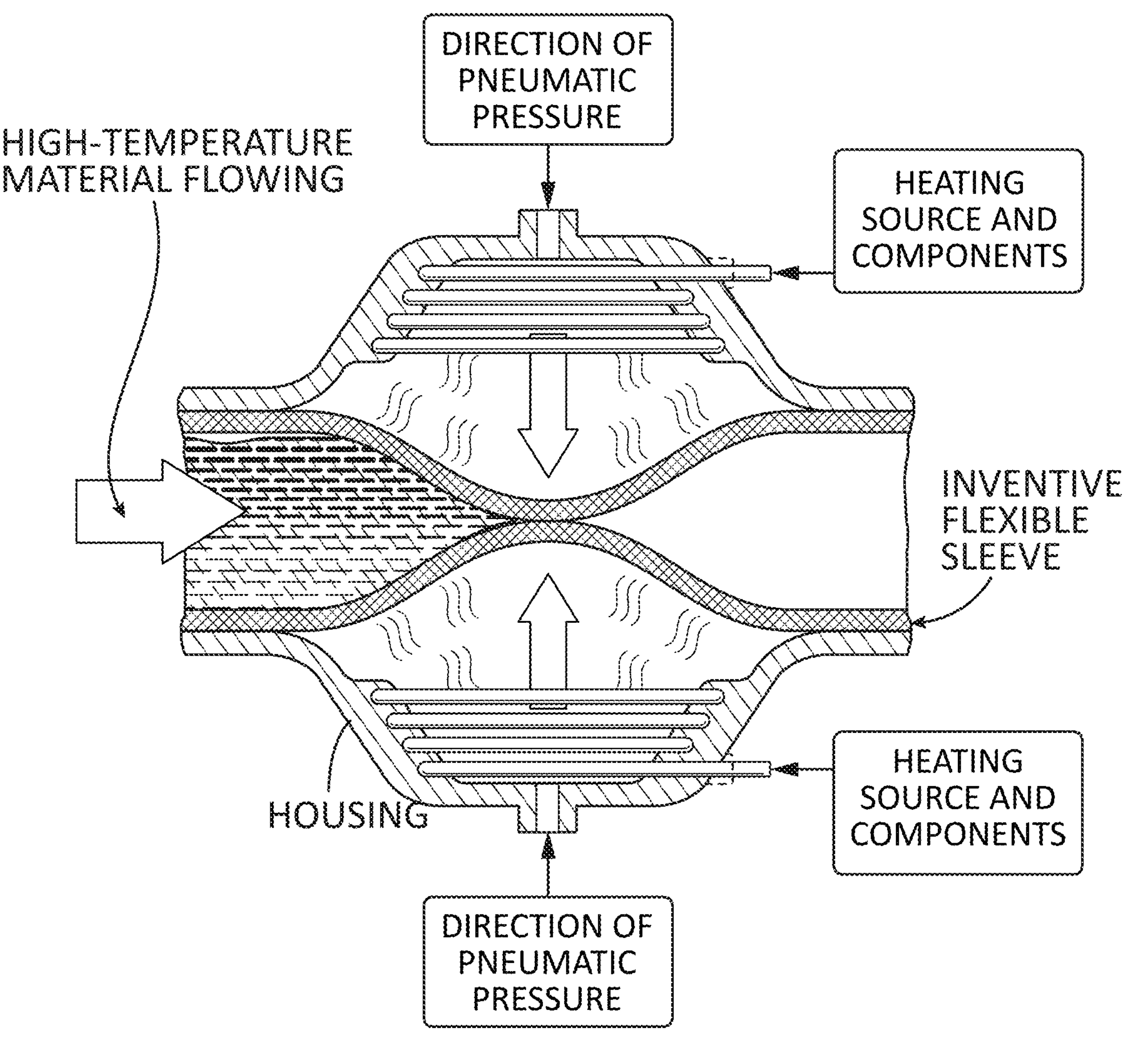
FIG. 9 is a schematic drawing of a device according to some embodiments described herein, including the inventive flexible sleeve of FIG. 4.

Example 6—In Example 6, the device includes the inventive flexible sleeve of Example 1, and a heating element is provided. Providing the heating element helps prevent cooling and hardening of the molten material while it is held in the device. See FIG. 9, which shows the heating element heating the high-temperature material being restrained by the pinched inventive flexible sleeve.

Example 7—In Example 7, the inventive flexible sleeve is made out of non-wetting ceramic material. The inventive flexible sleeve is formed by 3D printing the non-wetting ceramic material to form a sleeve having a woven structure. FIG. 4 is a schematic drawing of an inventive flexible sleeve as described herein. FIGS. 5A and 5B depict use of the inventive flexible sleeve of FIG. 4 with a high-temperature material, e.g., molten aluminum.

What is claimed is:

1. A device comprising:

a flexible sleeve, the flexible sleeve being a part of:

a composite comprising the flexible sleeve provided inside a rubber flexible sleeve so that the sleeves are coaxial; or a composite comprising the flexible sleeve provided with a non-porous coating on an exterior surface thereof; and two end connection ports that are located on opposite ends of the flexible sleeve and are aligned along a longitudinal axis of the flexible sleeve, wherein the flexible sleeve is capable of having a high-temperature material, which is a material at a temperature of 200° C. or more, enter the flexible sleeve through one of the two end connection ports, flow through the flexible sleeve, and exit the flexible sleeve through the other end connection port.

2. The device of claim 1, wherein the high-temperature material is a molten metal or molten metal alloy.

3. The device of claim 1, wherein the flexible sleeve is made from a material comprising at least one of the following: silica-fiber, glass-fiber, carbon-fiber, aramid-fiber, PEEK (polyether ether ketone)-fiber, PFA (perfluoroalkoxy)-fiber, and any combination thereof.

4. The device of claim 1, wherein at least one of the two end connection ports is a threaded connection port, a welded connection port, a soldered or sweat connection port, a welded connection port, a flanged connection port, a compression connection port, a clamp-style end connection port, or a union/true union connection port, or a glued connection port.

5. The device of claim 1, further comprising an actuator capable of applying pressure to the flexible sleeve to slow or stop the flow of the high-temperature material though the flexible sleeve.

6. The device of claim 1, further comprising an insulative material, an exothermic material, or a combination of an insulative material and an exothermic material surrounding or partially surrounding the flexible sleeve.

7. The device of claim 1, further comprising a heating element.

8. The device of claim 1, wherein the device is a pinch valve.

9. A method comprising:

providing a flexible sleeve, the flexible sleeve being a part of:

a composite comprising the flexible sleeve provided inside a rubber flexible sleeve so that the sleeves are coaxial; or a composite comprising the flexible sleeve provided with a non-porous coating on an exterior surface thereof; and flowing a high-temperature material, which is a material at a temperature of 200° C. or more, into the flexible sleeve, wherein the flexible sleeve is capable of having the high-temperature material flowed therein and being in direct contact with the flexible sleeve.

10. A method comprising:

providing a flexible sleeve, the flexible sleeve being a part of: a composite comprising the flexible sleeve provided inside a rubber flexible sleeve so that the sleeves are coaxial; or a composite comprising the flexible sleeve provided with a non-porous coating on an exterior surface thereof; and flowing a pre-determined amount of a high-temperature material, which is a material at a temperature of 200° C. or more, into and through the flexible sleeve to complete a run, wherein the flexible sleeve is capable of having the high-temperature material be flowed through it and in direct contact with it.

11. The method of claim 10, wherein the flexible sleeve is used for five runs or less, and then, the flexible sleeve is regenerated or discarded.

12. The method of claim 10, wherein the flexible sleeve is used for one run, and then, the flexible sleeve is regenerated or discarded.

13. The method of claim 10, wherein two or more flexible sleeves are provided in series or in parallel.

14. The method of claim 10, wherein the flexible sleeve is made from a material comprising at least one of the following: silica-fiber, glass-fiber, carbon-fiber, aramid-fiber, PEEK (polyether ether ketone)-fiber, PFA (perfluoroalkoxy)-fiber, and any combination thereof.

15. The method of claim 10, wherein the flexible sleeve is provided as part of a device comprising:

the flexible sleeve; and two end connection ports that are located on opposite ends of the flexible sleeve and are aligned along a longitudinal axis of the flexible sleeve.

16. The method of claim 10, wherein the device is a pinch valve and the method is a casting method.

* * * * *